UNITED STATES PATENT OFFICE.

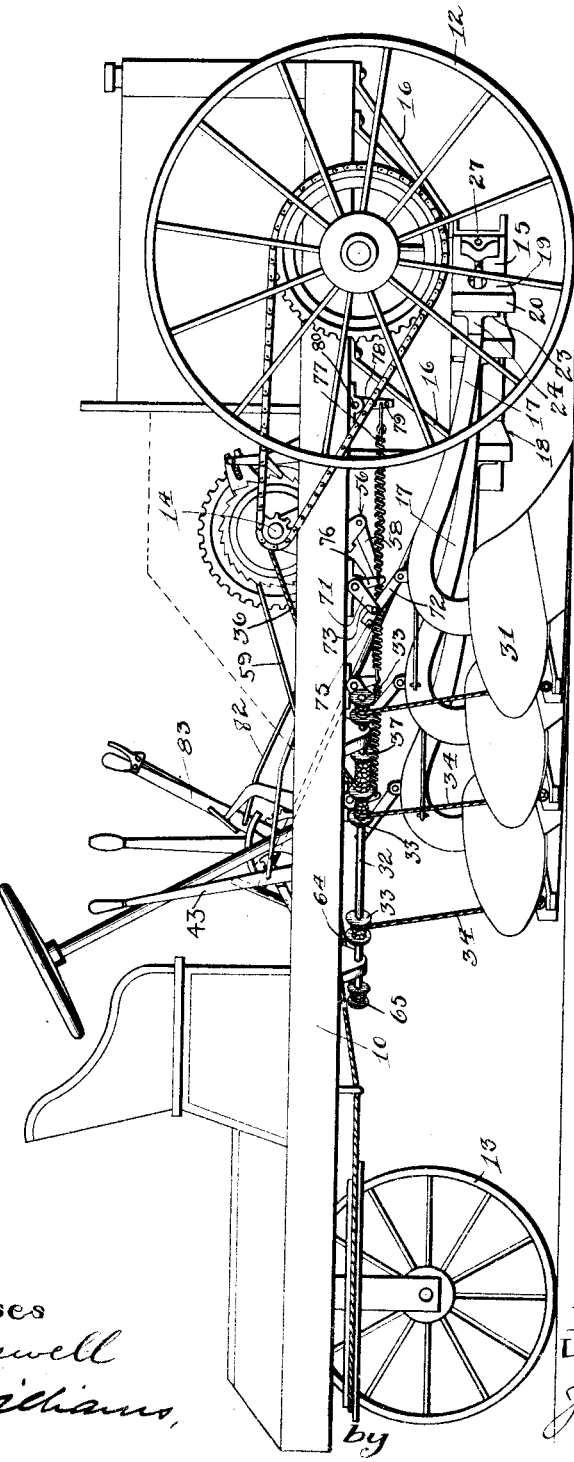

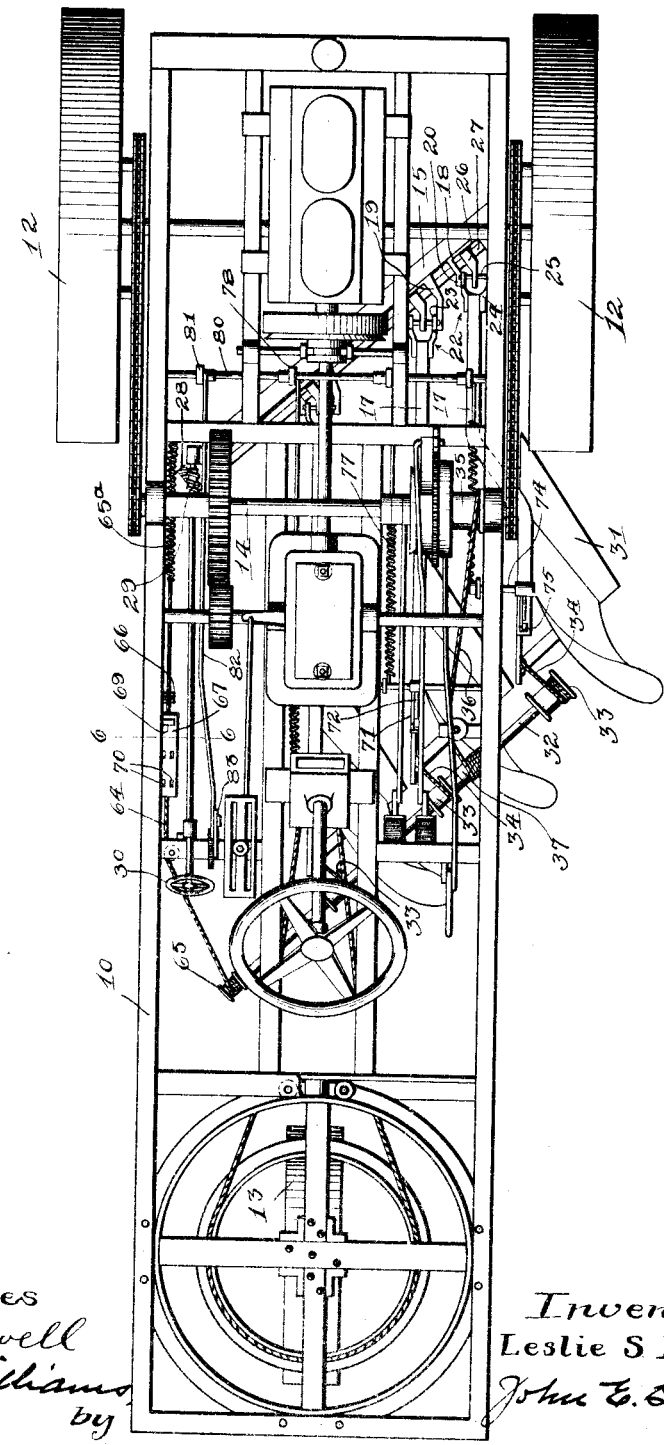

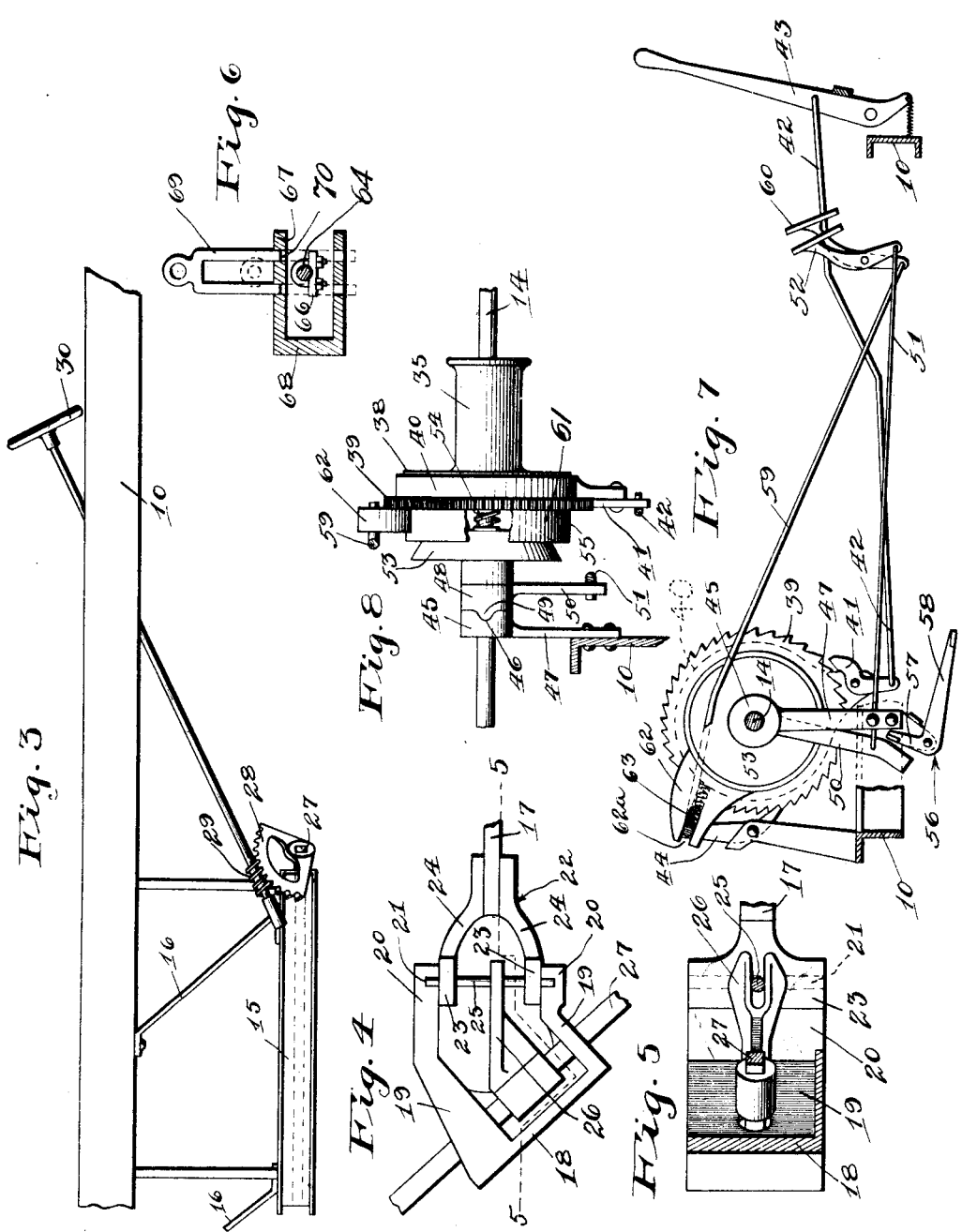

LESLIE S. HACKNEY, OF ST. PAUL, MINNESOTA.

MOTOR-PLOW.

1,031,062.  Specification of Letters Patent.  Patented July 2, 1912.

Application filed August 14, 1911. Serial No. 643,922.

*To all whom it may concern:*

Be it known that I, LESLIE S. HACKNEY, a citizen of the United States, residing at St. Paul, in the county of Ramsey and State of Minnesota, have invented new and useful Improvements in Motor-Plows, of which the following is a specification.

My invention relates to improvements in motor plows. Its object is to provide a device of this class having its plows flexibly attached to the frame, adjustable thereon and detachable therefrom.

A further object is to provide such a machine with plows adapted to be raised by hand and power, and with means for limiting the working depths of said plows.

In the drawings, Figure 1 is a side elevation of my improved motor plow; Fig. 2 is a plan view of the same, with the engine hood removed; Fig. 3 is a side elevation in detail showing part of the plow adjusting mechanism; Fig. 4 is a plan view in detail showing another part of said mechanism; Fig. 5 is a sectional view taken on the line 5—5 of Fig. 4; Fig. 6 is a detail sectional view taken on the line 6—6 of Fig. 2; Fig. 7 is an end elevation in detail showing part of the mechanism for raising and lowering the plows; and Fig. 8 is a side elevation of the same.

Referring to the accompanying drawings, I have used the reference numeral 10 to indicate the main frame. The traction wheels 12 are arranged to support the forward end of the frame and the steering wheel 13 to support its rear end. The power shaft 14 is revolubly mounted on said frame and is driven by a motor thereon. The draw bar 15 is suspended below the frame 10 and is rigidly attached thereto by the brace rods 16, said bar 15 being arranged between the wheels 12 and 13 in a diagonal position relative to the frame.

The plow beams 17 are connected to the bar 15 and are adjusted in the following described manner: The draw bar 15 is provided with brackets 18 having rearwardly extending arms 19 with vertical bearing plates 20 thereon, each plate being formed with a groove 21 on its inner face. The plow beams 17 are provided at their forward ends with yokes 22, each yoke having vertical bearing plates 23 on its arms 24 and horizontally arranged pins 25 extending through and beyond said plates. The pins 25 protrude from the plates 23 into the vertically arranged grooves 21 in the plates 20 and furnish an adjustable connection for the plow beams. The plates 23 fit closely within the plates 20 and prevent lateral motion of said beams. The forked arms 26 engage the pins 25 and are rigidly attached to the shaft 27 which is revolubly mounted on the draw bar 15. The worm sector 28 on the end of the shaft 27 meshes with the worm 29 and is oscillated by means of the hand wheel 30. The forked arms 26 normally hold the yokes in position in the brackets 18 and raise and lower said yokes therein, and may also be detached therefrom, by manipulation of the hand wheel 30.

The drum shaft 32 is revolubly mounted beneath the frame 10 and is provided with a plurality of drums 33. A cable 34 is attached to each of the plow bodies 31 and extends to one of the drums 33 above the plow body to which it is connected. The power and hand driven spool 35 is loosely mounted on the shaft 14, and the cable 36 is wound at one end on said spool and at its other end about the drum 37 on the shaft 32. The rotation of the spool 35 in one direction causes the winding of the cable 36 on said spool and the winding of the cables 34 on the drums 33, thus raising the plows, while the rotation of said spool in the opposite direction permits the unwinding of said cables, thus lowering the plows.

Means are provided whereby the plows may be raised by the operator as follows: The spool 35 is furnished with a drum 38 and ratchet 39. The collar 40 is loosely mounted on the drum 38 and supports the dog 41. This dog is connected by the rod 42 to the hand lever 43 and normally rests out of engagement with the ratchet 37. The rearward movement of the lever 43 causes the engagement of said dog 41 and ratchet 37 and continued reciprocation of the lever turns the spool 35 to raise the plows. The dog 44 on the frame 10 engages the ratchet 37 and prevents the rotation of said spool to lower the plows. Means are also provided whereby the plows are raised by power from the motor. The collar 45 having a recess 46 in its face is loosely mounted on the shaft 14 and is held from rotation thereon by the arm 47 which is fixed to the frame 10. The collar 48 having a cam 49 conforming with said recess 46 is loosely mounted on said shaft and is provided with an arm 50 said arm being connected by the rod 51 to the pedal 52. The clutch driving member 53 feathered on the shaft 14 is held by the spring 54 from engagement with the clutch driven member 55 on the spool 35 and in a position adjacent to the collar 48. The movement of the pedal 52 rotates the cam collar 48. The movement of the cam 49 in the fixed recess 46 causes a lateral separation of the collars 45 and 48 when the latter is rotated on the shaft 14 and causes the engagement of the clutch members 53 and 55 against the action of the spring 54, whereby the spool 35 is revolved to raise the plows. The spring 54 returns the collar 48 to its normal position and disengages the clutch members 53 and 55 as the pedal 52 is released.

A safety stop to limit the upward movement of the plows when raised by power is provided and comprises a bell crank 56 pivotally connected to the frame 10. Said crank is arranged with one crank arm 57 in the path of the arm 50 on the cam collar 48 and its other crank arm in the path of one of the plow beams 17. When the arm 58 is moved upward by said plow beam the crank arm 57 strikes the arm 50 and moves the cam collar back into its normal position against the pressure on the pedal 52 brought to bear by the operator in raising the plows, thus disengaging the clutch members 53 and 55 to stop the rotation of the spool 35.

The plows fall by gravity when released and their movement is controlled by the following described mechanism: The dog 44 which prevents the rotation of the spool 35 in a direction to lower the plows is connected by the rod 59 to the pedal 60. The outer periphery of the clutch driven member 55 forms a drum 61 and on this drum is mounted the brake shoe 62, having a slot 62ª. The rod 59 which is connected to the dog 44 extends into this slot 62ª. The spring 63 within the shoe 62 engages the rod 59 and yieldingly holds said shoe in position on the drum 61 and the dog 44 in engagement with the ratchet 37. A slight movement of the pedal 60 disengages the dog 44 from the ratchet 37 and releases the plows, while a further movement of said lever engages said brake shoe with the drum 61 to control the speed of the plows in their downward fall.

I have provided means for limiting the downward movement of the plows. The cable 64 is wound at one end about the drum 65 on the shaft 32 and is connected at its other end to a spring 65ª. The attachment of the cable 64 to the drum 65 is such that the rotation of the shaft 32 to lower the plows turns said drum in a direction to wind said cable. The spring 65ª which is fixed to the frame 10 keeps the cable 64 taut regardless of the rotation of the drum 65. The clamp 66 on the cable 64 moves between the flanges 67 of the support 68 and engages the stop 69 as the plows are lowered. This stop is adapted to be set in any of the pairs of perforations 70 in the flanges 67 and limits the working depth of the plows.

Supports are provided for yieldingly holding each of the plows in their operative positions. Said supports are identical in construction and the description of one will answer for all. The support comprises an upper link 71 and a lower link 72. These links are pivotally connected at 73, one end of the link 71 being carried by the stub shaft 74 on the frame 10 and the opposite end of the link 72 being pivotally connected to a plow beam 17. The links 71 and 72 are folded toward each other when the plows are elevated and extended when the plows are lowered. The stop 75 on the lower link 72 is provided to engage the upper link 71 and prevent the extreme extension of said links and the consequent alinement of their centers. Each of the stub shafts 74 is provided with an arm 76 which is connected by a spring 77 to a second arm 78 at the forward end of the frame. The arm 78 is formed with a series of apertures 79, each aperture being adapted to receive the spring 77. This spring tends to extend the support. Any upward movement of said support either by the inequalities of the ground or by the hand and power lift is accomplished against the action of said spring.

The tension of the springs 77 is adjusted simultaneously by the rotation of the shaft 80 on which the arms 78 are mounted. This shaft is provided with an upright arm 81 which is connected by the rod 82 to the lever 83. Said lever 83 rotates the shaft 80 to the position desired and locks the same in such position. The springs 77 may also be adjusted separately by attaching them in different apertures of their respective arms 78.

In operation the plows may be lifted by the manipulation of the hand lever and also by power from the motor by pressure on the pedal 52. The plows are released from their elevated position and the speed of their fall controlled by the movement of the pedal 60. The working depth of the plows is limited by the adjustment of the stop 69 in the support 68. Said plows are adjusted vertically at their forward ends by the manipulation of the hand wheel 30 and the pins 25 are removed from the grooves 21 by the forked arms 26 on further movement of said wheel, thus detaching the plows from the frame. The tension of the springs 77 which operate the supports to yieldingly hold the plows in their operative positions is increased or diminished by the movement of the hand lever 83. The tension of each individual spring may also be altered by changing its point of connection with its arm 78.

Having described my invention, what I claim as new and desire to protect by Letters Patent, is:

1. In a device of the class described, the combination of a frame having supporting wheels, a draw bar carried by said frame, brackets on said draw bar, plow beams slidably mounted at their forward ends in said brackets and capable of vertical movement therein, plow bodies on said beams, and means for simultaneously adjusting said beams in said brackets and for detaching the same therefrom.

2. In a device of the class described, the combination of a frame having supporting wheels, a draw bar carried by said frame, brackets on the draw bar having guide plates with a vertical groove in each, plow beams carrying plow bodies, yokes on said beams having guide plates adapted to fit within said first mentioned plates to prevent lateral movement of said beams, pins in said plates adapted to engage and travel in said grooves, a shaft revoluble on the draw bar, forked arms on said shaft in engagement with said pins and means for rotating said shaft to raise and lower the forward ends of said plow beams.

3. In a plow of the class described, the combination of a frame having supporting wheels, a draw bar carried by said frame, plow beams carrying plow bodies, transverse horizontal pivots slidable vertically on said bar and connecting the same with the several plow beams and means for simultaneously adjusting said pivots to vary and limit the working depth of the plow bodies and to detach said beams from said bar.

4. In a device of the class described, the combination of a frame having supporting wheels, a draw bar arranged diagonally beneath said frame, plow beams carrying plow bodies, brackets on said bar having vertical grooves therein, transverse pivots slidable in said grooves and connecting said brackets and beams and means for adjusting said pivots in said grooves and detaching the same therefrom.

5. In a plow of the class described, the combination of a frame having supporting wheels, a draw bar carried by said frame, plow beams carrying plow bodies, transverse horizontal pivots, slidable vertically on said bar and connecting the same with the several plow beams, arms detachably connected with said pivots and means for simultaneously operating said arms to vary the working depth of the plow bodies and to detach said beams from said bar.

6. In a device of the class described, the combination of a frame, having supporting wheels, a draw bar carried by said frame, plow beams connected at their forward ends with said bar, plow bodies on said beams and means for simultaneously adjusting said beams on or detaching the same from said bars.

7. In a plow of the class described, the combination of a frame having supporting wheels, a draw bar arranged diagonally beneath said frame, plow beams carrying plow bodies, transverse pivots slidable vertically upon said bar and connecting the same with the several plow beams, a shaft parallel with said bar and in operative connection with said transverse pivots and means for rotating said shaft.

8. In a plow of the class described the combination of a frame having supporting wheels, a draw bar carried by said frame, plow beams carrying plow bodies, transverse pivots slidable vertically upon said bar and connecting the same with the several plow beams, arms pivotally and slidably connected with said transverse pivots and means for operating said arms to raise and lower said beams.

9. In a plow of the class described, the combination of a frame having supporting wheels, a draw bar arranged diagonally beneath said frame, plow beams carrying plow bodies, transverse pivots slidable vertically upon said bar and connecting the same with the several plow beams, a shaft parallel with and revoluble on said bar, arms on said shaft pivotally and slidably connected with said transverse pivots and means for rotating said shaft to raise and lower said beams.

10. The combination of a draft frame, a draw bar arranged diagonally on said frame, plow beams carrying plow bodies, transverse pivots slidable vertically upon said bar and connecting the same with the several plow beams, a shaft parallel with said bar and in operative connection with said transverse pivots and means for rotating said shaft.

11. The combination of a draft frame, a draw bar arranged diagonally on said frame, plow beams carrying plow bodies, transverse pivots slidable upon said bar and connecting the same with the several plow beams, a shaft parallel with said bar, arms on the shaft pivotally and slidably connected with said transverse pivots and means for operating said shaft.

12. In a device of the class described, the combination of a frame having supporting wheels, a draw bar carried by said frame, plow beams having their forward ends slidable vertically on said bar, plow bodies on said beams, a revoluble shaft, arms on said shaft in connection with said beams, and means for rotating said shaft.

13. In a device of the class described, the combination of a frame having supporting wheels, a draw bar carried by said frame, plow beams having their forward ends movable on and detachable from said bar, plow bodies on said beams, a revoluble shaft on said bar, arms on said shaft detachably connected with said beams, and means for rotating said shaft to simultaneously adjust said beams on said bar or detach the same therefrom.

14. In a device of the class described, the combination of a frame having supporting wheels, a draw bar on said frame, plow beams having their forward ends movable on said bar, a revoluble shaft on the bar, arms on said shaft connected with said beams, and means for locking said shaft and for rotating the same to adjust said beams on said bar or detach the same therefrom.

15. In a device of the class described, the combination of a frame having supporting wheels, a draw bar on said frame, plow beams having their forward ends movable on said bar, plow bodies on said beams, a revoluble shaft on said bar, arms on said shaft connected with said beams, a gear on the shaft, a second gear in mesh with said first mentioned gear, and a hand operated shaft for turning said second mentioned gear to rotate said first mentioned shaft.

In testimony whereof, I have signed my name to this specification in the presence of two subscribing witnesses.

LESLIE S. HACKNEY.

Witnesses:
ASHLEY COFFMAN,
LOUIS JOHNSON.